US012689723B2

(12) United States Patent
Zhao et al.

(10) Patent No.: US 12,689,723 B2
(45) Date of Patent: Jul. 21, 2026

(54) REFERENCE PICTURE LIST SIGNALING FOR MULTI-VIEW CODING

(71) Applicant: Tencent America LLC, Palo Alto, CA (US)

(72) Inventors: Xin Zhao, Palo Alto, CA (US); Liang Zhao, Palo Alto, CA (US); Yushin Cho, Palo Alto, CA (US); Madhu Peringassery Krishnan, Palo Alto, CA (US); Jing Ye, Palo Alto, CA (US); Han Gao, Palo Alto, CA (US); Tianqi Liu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 44 days.

(21) Appl. No.: 18/806,306

(22) Filed: Aug. 15, 2024

(65) Prior Publication Data

US 2025/0294135 A1 Sep. 18, 2025

Related U.S. Application Data

(60) Provisional application No. 63/566,802, filed on Mar. 18, 2024.

(51) Int. Cl.
*H04N 19/105* (2014.01)
*H04N 19/172* (2014.01)
*H04N 19/597* (2014.01)
*H04N 19/70* (2014.01)

(52) U.S. Cl.
CPC ......... *H04N 19/105* (2014.11); *H04N 19/172* (2014.11); *H04N 19/597* (2014.11); *H04N 19/70* (2014.11)

(58) Field of Classification Search
None
See application file for complete search history.

(56) References Cited

U.S. PATENT DOCUMENTS

2013/0188708 A1* 7/2013 Rusert ................... H04N 13/10
375/240.12

* cited by examiner

*Primary Examiner* — Christopher Braniff
(74) *Attorney, Agent, or Firm* — Morgan, Lewis & Bockius LLP

(57) ABSTRACT

The various implementations described herein include methods and systems for coding video. In one aspect, a video decoding method includes receiving a multi-view video bitstream comprising a plurality of pictures. The plurality of pictures includes a first picture corresponding to a first view and a second picture corresponding to a second view. The method includes determining whether reference picture information is shared for the first picture and the second picture. The method includes, when the reference picture information is shared, decoding the first picture and the second picture using the reference picture information.

18 Claims, 6 Drawing Sheets

Figure 1:
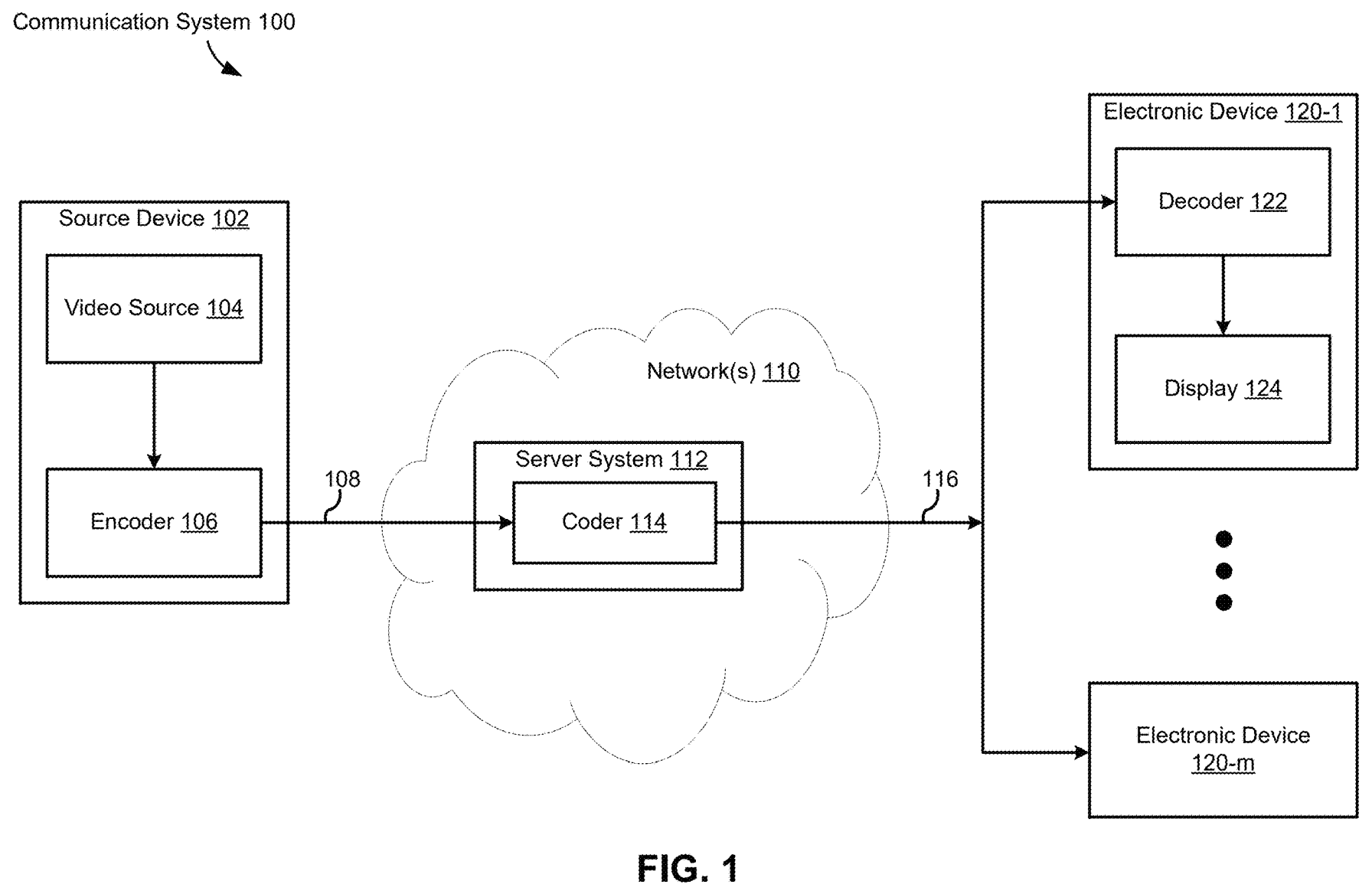

Communication System 100

Source Device 102

Video Source 104

Encoder 106

Network(s) 110

Server System 112

Coder 114

108

116

Electronic Device 120-1

Decoder 122

Display 124

Electronic Device 120-m

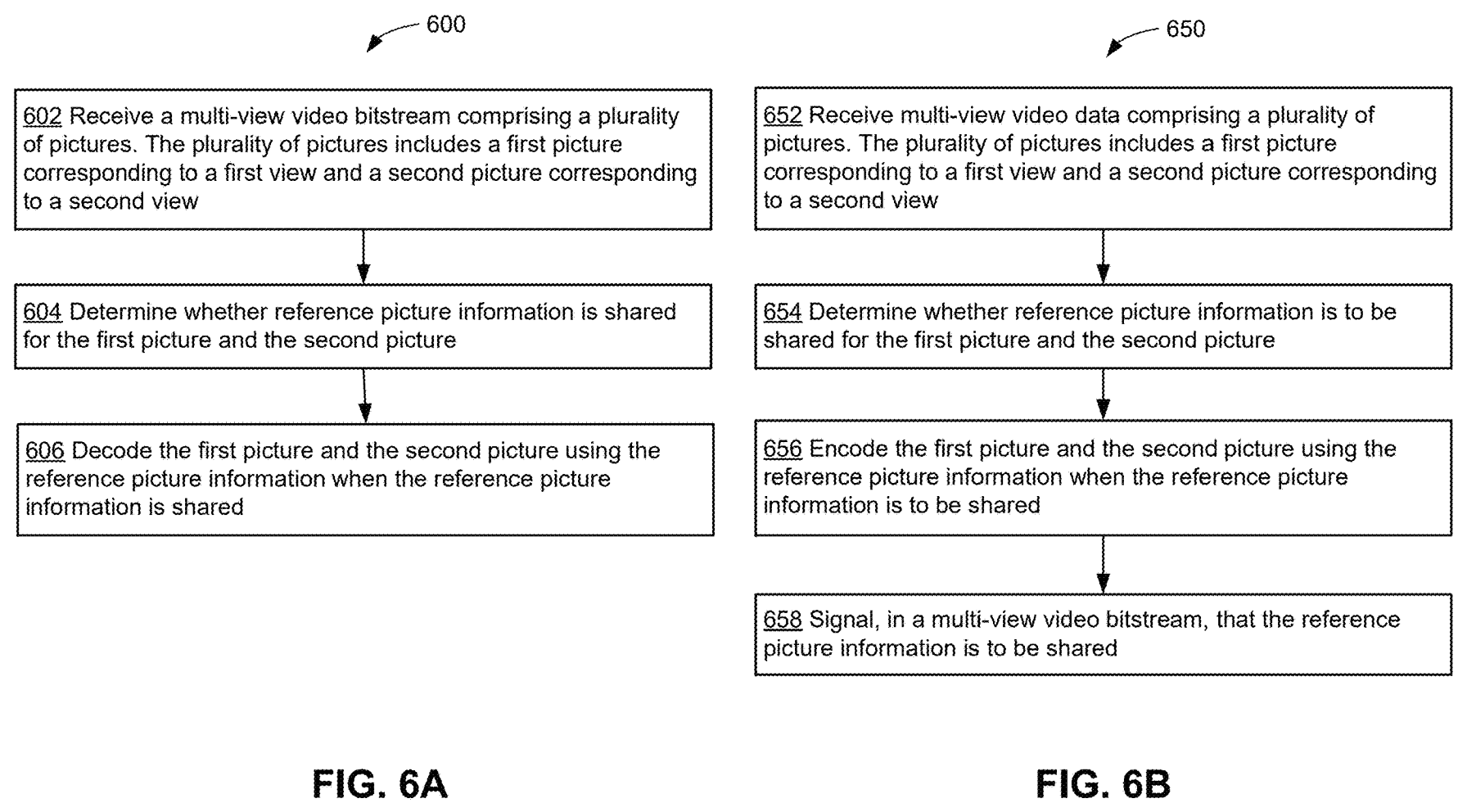

652 Receive multi-view video data comprising a plurality of pictures. The plurality of pictures includes a first picture corresponding to a first view and a second picture corresponding to a second view 654 Determine whether reference picture information is to be shared for the first picture and the second picture 656 Encode the first picture and the second picture using the reference picture information when the reference picture information is to be shared 658 Signal, in a multi-view video bitstream, that the reference picture information is to be shared

602 Receive a multi-view video bitstream comprising a plurality of pictures. The plurality of pictures includes a first picture corresponding to a first view and a second picture corresponding to a second view 604 Determine whether reference picture information is shared for the first picture and the second picture 606 Decode the first picture and the second picture using the reference picture information when the reference picture information is shared

FIG. 6A

REFERENCE PICTURE LIST SIGNALING FOR MULTI-VIEW CODING

RELATED APPLICATIONS

This application claims priority to U.S. Provisional Patent Application No. 63/566,802, entitled "Reference Picture List Signaling for Multi-view Coding," filed Mar. 18, 2024, which is hereby incorporated by reference in its entirety.

TECHNICAL FIELD

The disclosed embodiments relate generally to video coding, including but not limited to systems and methods for reference picture list signaling when multiple views of video (e.g., image) content are being coded.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to reference picture list signaling when multiple views of a scene are being coded. In some embodiments, instead of coding each view and sending bitstreams from each view independently (simulcast coding), a disparity-compensated prediction approach is implemented whereby pictures of other views are included at the same time instance in the reference picture list. This approach, also known as disparity-compensated prediction, can improve coding efficiency by reducing statistical redundancy that exist between different views. In some instances, the approaches disclosed herein can achieve about 70% bitrate savings over simulcast coding. An advantage of the disclosed reference picture listing signaling approach is reduced signaling and improved coding efficiency (e.g., by sharing reference picture information that is signaled for a first view of a multi-view video bitstream with a second view of the multi-view video bitstream).

In accordance with some embodiments, a method of video decoding is provided. The method includes (i) receiving a multi-view video bitstream (e.g., a coded video sequence) comprising a plurality of pictures, where the plurality of pictures includes a first picture corresponding to a first view and a second picture corresponding to a second view; (ii) determining whether reference picture information is shared for the first picture and the second picture; and (iii) when the reference picture information is shared, decoding the first picture and the second picture using the reference picture information. In some embodiments, when the reference picture information is not shared, the first picture is decoded using a first reference picture list and the second picture is decoded using a second reference picture list.

In accordance with some embodiments, a method of video encoding is provided. The method includes (i) receiving multi-view video data (e.g., source video sequence) comprising a plurality of pictures, where the plurality of pictures includes a first picture corresponding to a first view and a second picture corresponding to a second view; (ii) determining whether reference picture information is to be shared for the first picture and the second picture; and (iii) when the reference picture information is to be shared: (a) encoding the first picture and the second picture using the reference picture information; and (b) signaling, in a multi-view video bitstream, that the reference picture information is to be shared. In some embodiments, when the reference picture information is not shared, the first picture and the second picture are encoded using independent reference information. In some embodiments, when the reference picture information is not shared, an indicator is signaled in the bitstream to indicate that the reference picture information is not to be shared.

In accordance with some embodiments, a method of processing visual media data includes: (i) obtaining a source multi-view video sequence that comprises a plurality of frames; and (ii) performing a conversion between the source multi-view video sequence and a multi-view video bitstream of visual media data according to a format rule, where the multi-view video bitstream comprises: (a) the plurality of encoded pictures includes a first picture corresponding to a first view and a second picture corresponding to a second view, and (b) when reference picture information is to be shared for the first picture and the second picture, shared reference picture information; and where the format rule specifies that when the reference picture information is to be shared, the first picture and the second picture are to be decoded using the shared reference picture information.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
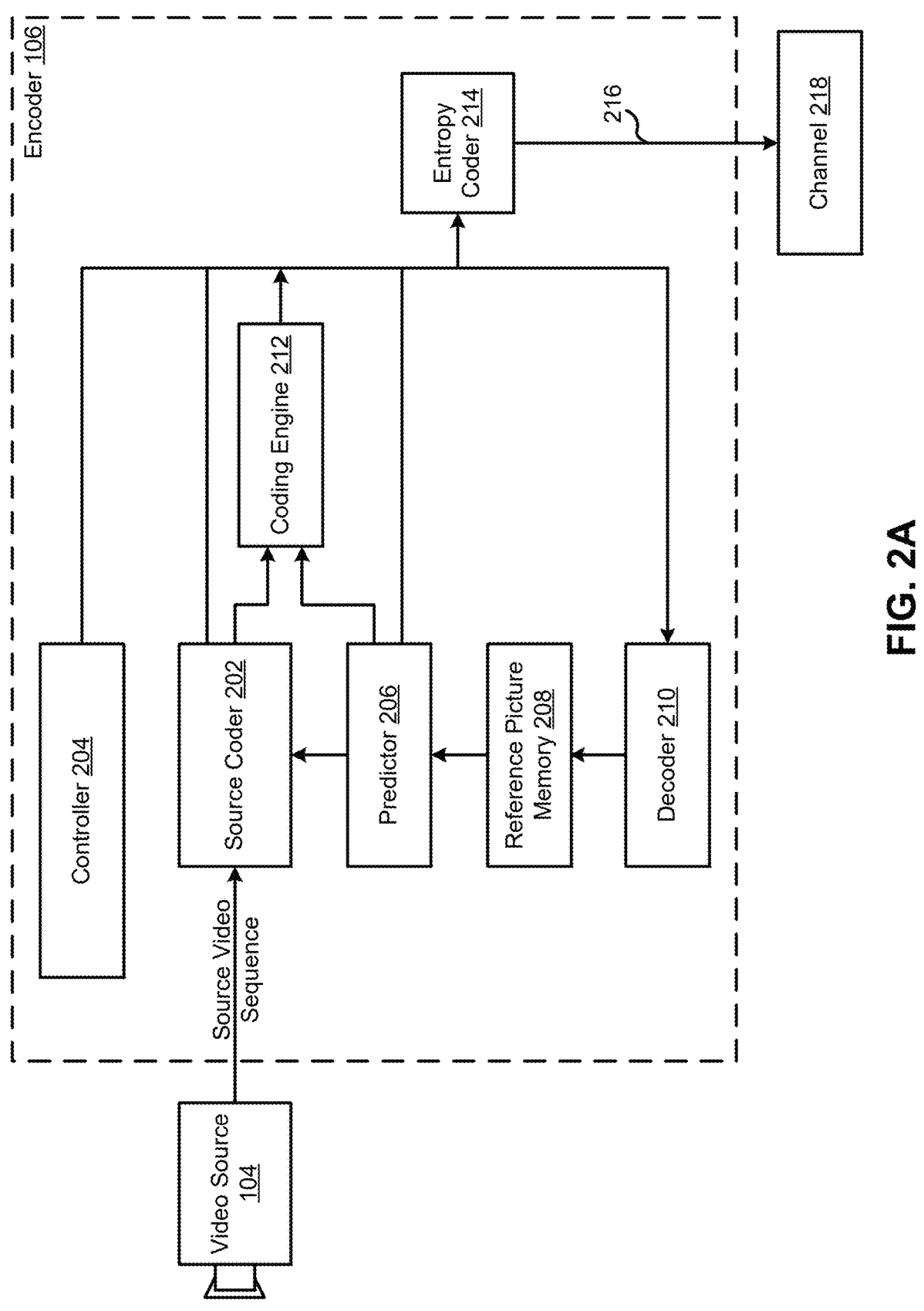
FIG. 2A is a block diagram illustrating example elements of an encoder component in accordance with some embodiments.

The present disclosure describes video/image compression techniques including reference picture information signaling for multi-view video coding. The disclosed techniques include sharing reference picture information for pictures belonging to different views of the multi-view video. An example multi-view video bitstream includes a first picture corresponding to a first view and a second picture corresponding to a second view. When it is determined that reference picture information is to be shared for the first picture and the second picture, the first picture and the second picture are decoded using the shared reference picture information. Sharing the reference picture information between the first view and the second view reduces inter-view redundancies and increases coding efficiency.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
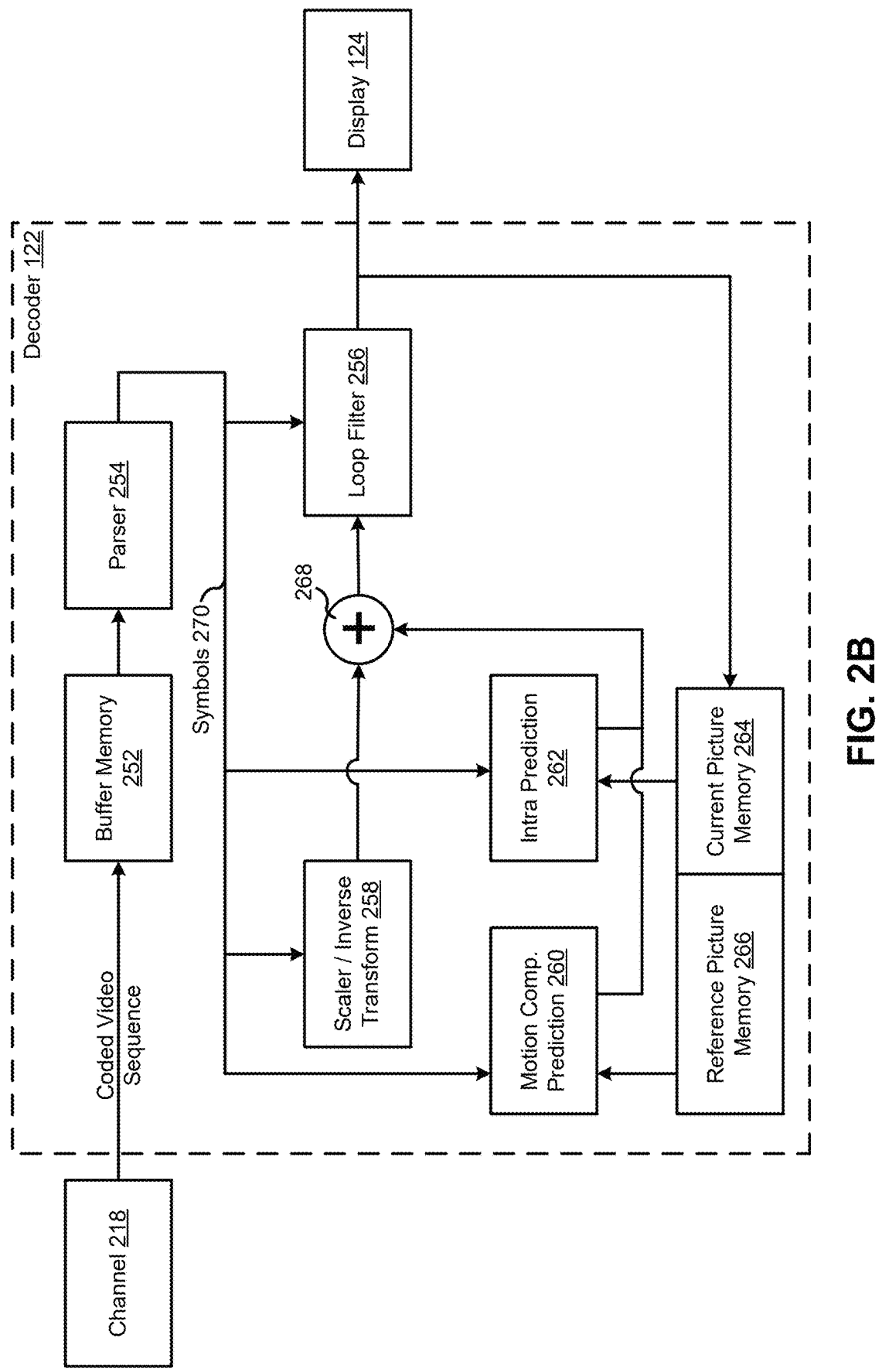
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when subsample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
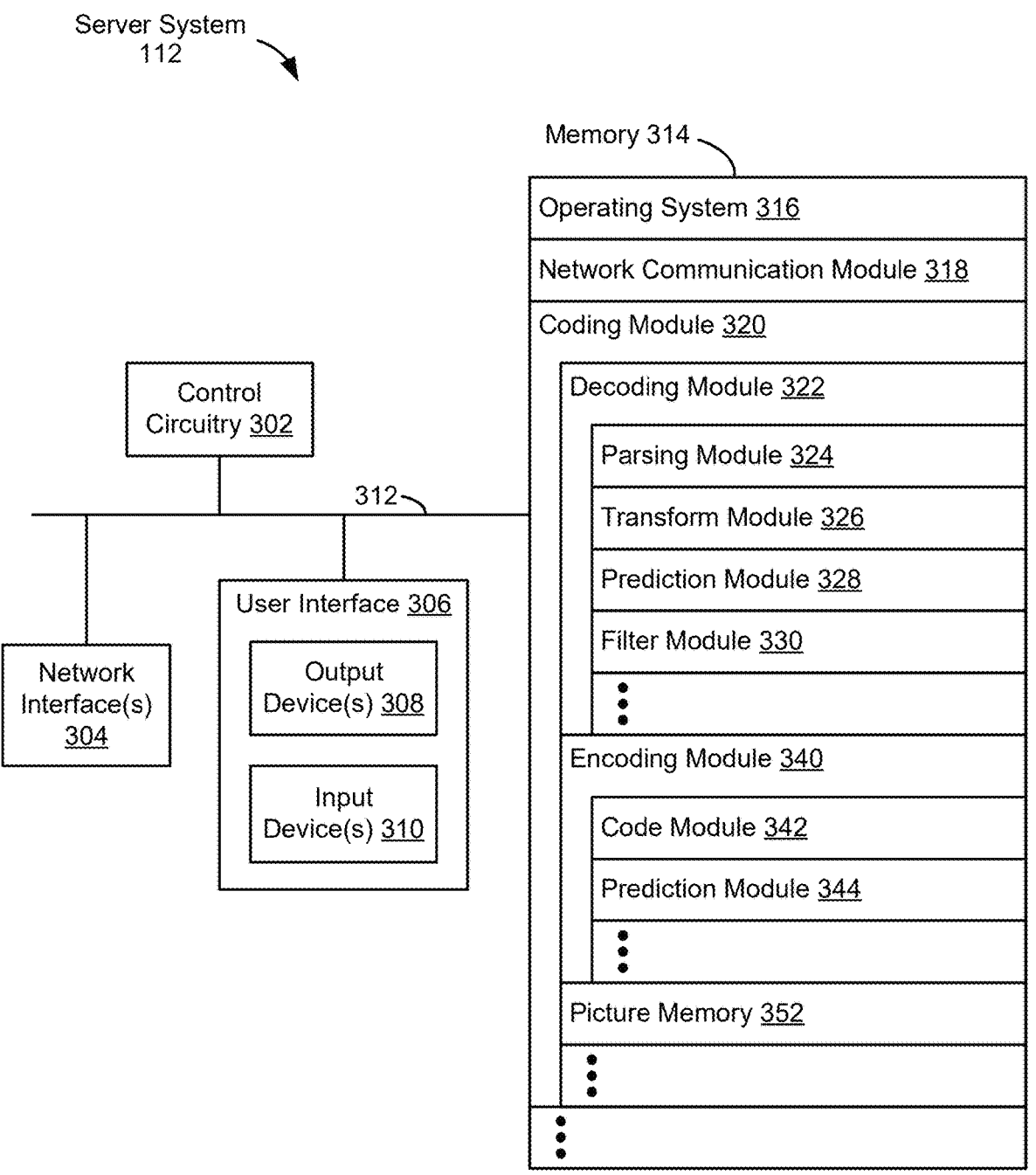
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, methods of reference picture list signaling for multi-view video coding are described.

As used herein, a block may refer to a largest coding block, a coding block/unit, a prediction block, or transform block, or a pre-defined fixed block size. In some embodiments, a block refers to the filtering unit, which is the block unit on which a loop filtering method is performed. Additionally, a high-level syntax can include sequence level flags, picture level flags, subpicture level flags, tile-level flag, slice-level flags, largest coding block row level flags, or largest coding block level flags.

Figure 4:
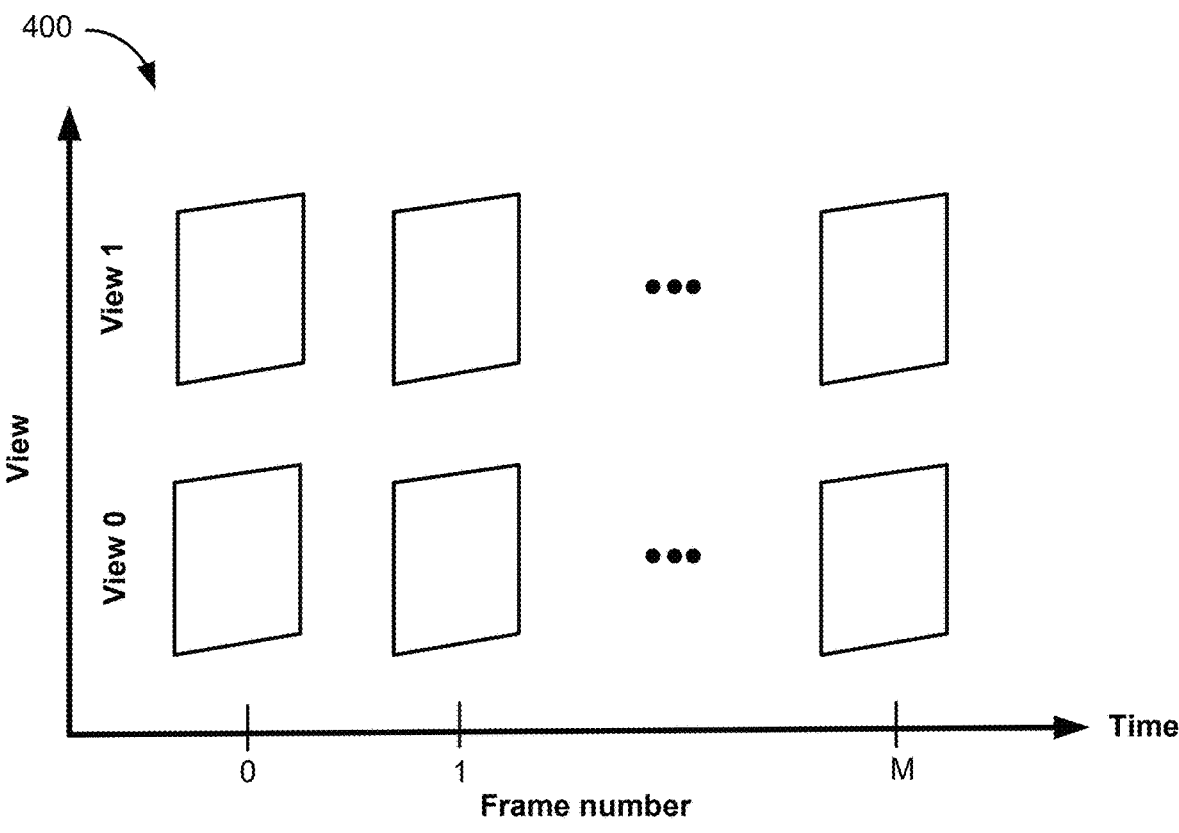
FIG. 4 illustrates an example multi-view video coding according to some embodiments.

FIG. 4 illustrates an example multi-view video 400 with two views (e.g., View 0 and View 1) according to some embodiments. Each view may be associated with a different viewport or camera. For applications such as stereo video viewing, videos of more than one view may be coded. In some embodiments, the multi-view video 400 corresponds to a 3D scene captured by two or more cameras. In some instances, optional processing, such as rectification and color correction of the views, is performed on the sender side. After encoding the multi-view video sequences, the bitstream is transmitted to the receiver-side, where the views are decoded and presented on a suitable 3D display. In some embodiments, a multi-view video includes more than two views.

Figure 5:
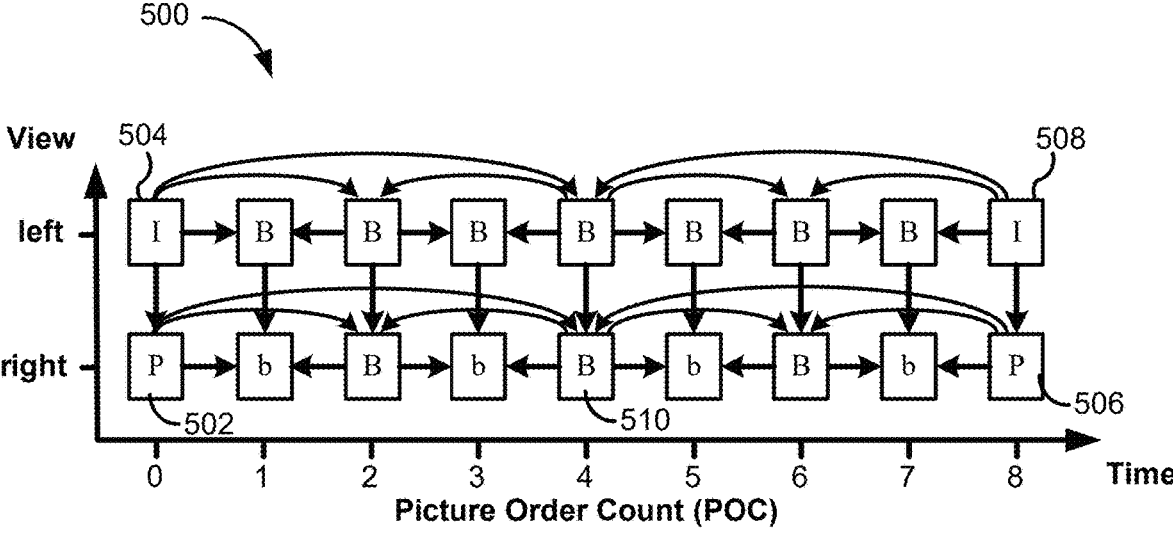
FIG. 5 illustrates an example operation in a multi-view video coding according to some embodiments.

FIG. 5 illustrates an example prediction structure 500 for a multi-view video according to some embodiments. The structure 500 uses temporal reference pictures (represented by horizontal and curvy arrows) and inter-view reference pictures (represented by vertical arrows) for motion- and disparity-compensated prediction. FIG. 5 shows two sequences of pictures, corresponding to the left and right views, where the pictures in the left view are used to predict pictures in the right view due to the strong correlation between the two views, thus improving coding efficiency. Picture 502 in the right view (POC 0) is a P picture/frame that is coded (e.g., predicted) using picture 504 in the left view as a reference picture. The picture 504 is an I picture. The next frame that is coded in the right view is picture 506 (POC 8), corresponding to the last P frame in the sequence.

Picture 502 and picture 506 are then used to derive picture 510 (POC 4) in the right view. The picture 510 is a bidirectional B picture/frame. The obtained POC 0, POC 8, and POC 4 in the right view are then used to derive POC2 and POC 6 in the right view. In some embodiments, the pictures in the right view are in multiple layers. For example, the odd-numbered POCs in the right view (denoted by lowercase "b") are in a different layer from the even-numbered POCs.

In a multi-view video bitstream, different views can have strong correlation and reducing the statistical redundancy that exist between different views is helpful in improving coding efficiency. As described in detail below, some multi-view video techniques include jointly signaling of reference pictures for pictures belonging to different views of the multi-view video. An example multi-view video bitstream includes a first picture corresponding to a first view and a second picture corresponding to a second view. In some embodiments, when reference picture information is shared between a first view and a second view, the first picture and the second picture are encoded/decoded using shared reference picture information.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a multi-view video bitstream (e.g., a coded video sequence) comprising a plurality of pictures. The plurality of pictures includes a first picture corresponding to a first view and a second picture corresponding to a second view. The system determines (604) whether reference picture information (e.g., a reference picture list, or one or more reference pictures) is shared for the first picture and the second picture. The system decodes (606) the first picture and the second picture using the reference picture information when the reference picture information is shared. In this way, reference picture list signaling can be shared among different views. For example, the reference picture list that is signaled for a first view can be applied as the reference picture list (or as a subset of the reference picture list) used for a second view.

In some embodiments, a high-level flag (e.g., denoted joint_rpl_flag) is signaled to indicate whether the reference picture list of two or more views are signaled separately or jointly. The high-level flag (joint_rpl_flag) may be signaled at a sequence level or at a frame-level. When the high-level flag is signaled at the frame level, the decision as to whether the reference picture list is jointly signaled may be made on a frame-by-frame basis.

In some embodiments, the signaled reference picture list is partially shared among multiple views. For example, only the indices associated with the first N or the last M reference pictures (where N and M are positive integers) are signaled jointly among different views (e.g., shared among different views) while the remaining reference pictures are still separately signaled for different views.

In some embodiments, whether the signaled reference picture list for the first view is shared with the second view depends on the temporal level of current frame. For example, the temporal ID level of a frame can indicate how important the frame is (e.g., I frames are the most important). For example, if the temporal level of current frame is smaller than (or greater than) a threshold (e.g., ID level 0 or 1), the reference frame list is shared among different views.

In some embodiments, the reference picture list is signaled only for the base view (e.g., the reference picture information is signaled first in bitstream and can be referenced by other views). For other views of the multi-view video bitstream, the reference picture list may not be further signaled but updated adaptively based on coded information, such as a quantization parameter of a candidate reference picture or a temporal distance of a candidate reference picture relative to the current picture.

In some embodiments, the reference picture list may be first signaled for the base view (which is signaled first in the bitstream and can be referenced by other views) and for other views, updates, modifications, and/or replacements to the signaled reference picture list of the base view are further signaled. As an example, for each signaled entry of reference picture list associated with the base view, a flag may be signaled to indicate whether a replacement of the reference picture is to be performed. When a replacement of reference picture happens, another syntax may be signaled to indicate the reference picture that is going to replace the current entry.

In some embodiments, one reference picture buffer is used to store all the reference pictures available for all the views of the multi-view video. For example, for each view, indices may be signaled to indicate which reference pictures from the reference picture buffer are used for the current view. This distinguishes from current implementations, which may have one reference picture buffer for the first view and a separate reference picture buffer for the second view (e.g., requiring more memory hardware).

In some embodiments, one reference picture buffer is used to store all the reference pictures (including the temporal POC value and the view index information) available for all the views. For each view, the applicable reference picture list may be determined based on the coded information, including but not limited to POC values and the view index information.

In some embodiments, for each view, the reference pictures stored in the reference picture buffer are ranked based on one or more of: the temporal distance between the reference picture and the current picture, and the view index differences, and the quantization parameters of the reference pictures. For example, for reference pictures with the same temporal distance between the reference picture and the current picture and same quantization parameters, the reference picture closer to the current view may be prioritized to be selected as an applicable reference picture for the current picture.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system. In some embodiments, the method 650 is performed by a same system as the method 600 described above.

The system receives (652) multi-view video data (e.g., a source video sequence) comprising a plurality of pictures. The plurality of pictures includes a first picture corresponding to a first view and a second picture corresponding to a second view. The system determines (654) whether reference picture information is to be shared for the first picture and the second picture. The system encodes (656) the first picture and the second picture using the reference picture information when the reference picture information is to be shared. The system signals (658), in a multi-view video bitstream, that the reference picture information is to be shared. In some embodiments, when the reference picture information is not shared, the system signals that the reference picture information is not to be shared. As described previously, the encoding process may mirror the decoding processes described herein (e.g., reference picture information signaling/parsing). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a multi-view video bitstream comprising a plurality of pictures, where the plurality of pictures includes a first picture corresponding to a first view and a second picture corresponding to a second view; (ii) determining whether reference picture information is shared for the first picture and the second picture; and (iii) when the reference picture information is shared, decoding the first picture and the second picture using the reference picture information. For example, reference picture list signaling can be shared among different views. As an example, the reference picture list that is signaled for a first view can be applied as the reference picture list (or as a subset of the reference picture list) used for a second view. In some embodiments, the first reference picture is the second reference picture. In some embodiments, the first reference picture is different than the second reference picture. In some embodiments, the reference picture information comprises a set of reference pictures. In some embodiments, when the reference pictures is shared, the first picture is decoded by selecting a first reference picture from the set of reference pictures, and the second picture is decoded by selecting a second reference picture from the set of reference pictures. In some embodiments, the first picture and the second picture are decoded using the reference picture information in accordance with a determination that the reference picture information is shared.

(A2) In some embodiments of A1, the method further comprises, when the reference picture information is not shared, decoding the first picture using first reference picture information and decoding the second picture using second reference picture information. The first reference picture information is signaled separately from the second reference picture information. In some embodiments, when the reference picture information is not shared, the first picture is decoded by selecting the first reference picture from a first set of reference pictures and the second picture is decoded by selecting the second reference picture from a second set of reference pictures, where the second set of reference pictures does not share a reference picture with the first set of reference pictures. In some embodiments, the first reference picture information is signaled, and the second reference picture information is derived without regard to the first reference picture information.

(A3) In some embodiments of A1 or A2, determining whether the reference picture information is shared for the first picture and the second picture comprises parsing an indicator in the multi-view video bitstream that indicates whether the reference picture information is shared. For example, a high-level flag (namely joint_rpl_flag) is signaled to indicate whether the reference picture lists of two (or more) views are signaled separately or jointly. In some embodiments, the indicator is signaled in a high-level syntax.

(A4) In some embodiments of A3, the indicator is signaled at a frame level or a sequence level in the multi-view video bitstream. For example, the high-level flag (joint_rpl_flag) may be signaled at sequence level or frame-level. When this high-level flag (joint_rpl_flag) is signaled at frame-level, the decision on whether the reference picture list is jointly signaled may be made on a frame-by-frame basis.

(A5) In some embodiments of any of A1-A4, the method further includes, when the reference picture information is shared: (i) populating a first reference list for the first picture by inserting a set of reference pictures indicated by the reference picture information and inserting one or more first reference pictures; and (ii) populating a second reference list for the second picture by inserting the set of reference pictures indicated by the reference picture information and inserting one or more second reference pictures. For example, the signaled reference picture list is partially shared among multiple views. As an example, only the indices associated with the first N (and/or the last M) reference pictures are signaled jointly among different views (e.g., shared among different views), while the remaining reference pictures are separately signaled for the different views.

(A6) In some embodiments of any of A1-A5, whether the reference picture information is shared for the first picture and the second picture is determined based on a temporal level of the first picture. For example, whether the signaled reference picture list for the first view is shared with the second view depends on the temporal level (e.g., a temporal level identifier) of a current frame.

(A7) In some embodiments of A6, when the temporal level of the first picture is less than a predetermined threshold value, the reference picture information is determined to be shared for the first picture and the second picture. For example, if the temporal level of current frame is smaller than (or greater than) a threshold (e.g., ID level 0 or 1), the reference frame list is shared among different views.

(A8) In some embodiments of any of A1-A7, when the reference picture information is shared: (i) a first set of reference pictures is signaled for the first view; and (ii) a second set of reference pictures is derived for the second view based on the first set of reference pictures. For example, a reference picture list is signaled for a base view (which is signaled first in the video bitstream and can be referenced by other views). For other views, updates, modifications, and/or replacements to the signaled reference picture list of the base view are further signaled. In some embodiments, identification of the first set of reference pictures is parsed from the multi-view video bitstream.

(A9) In some embodiments of A8, the method further comprises parsing respective indicators corresponding to the first set of reference pictures. Each respective indicator indicates whether a corresponding reference picture of the first set of reference pictures is to be replaced for the second view. For example, for each signaled entry of reference picture list associated with the base view, a flag is signaled to indicate whether a replacement of the reference picture is performed. As an example, when a replacement of reference picture happens, another syntax is signaled to indicate the reference picture which is going to replace the current entry.

(A10) In some embodiments of any of A1-A9, the first picture and the second picture are decoded using a same reference picture buffer storing the reference picture information. For example, a reference picture buffer (e.g., for all the views) is used to store all the reference pictures available for all the views. For each view, indices are signaled to indicate which reference pictures from the reference picture buffer are used for the current view. In some embodiments, decoding the first picture comprises determining an index to the reference picture buffer for the first picture, and decoding the second picture comprises determining a second index to the reference picture buffer for the second picture.

(A11) In some embodiments of A10, the method further comprises (i) identifying a first portion of the reference picture buffer to use as a first reference picture list for the first picture; and (ii) identifying a second portion of the reference picture buffer to use a second reference picture list for the second picture. For example, a reference picture buffer is used to store all the reference pictures (including the temporal POC value and the view index information) available for all the views. For each view, the applicable reference picture list is determined based on the coded information, including POC values and the view index information.

(A12) In some embodiments of A10 or A11, the method further comprises (i) applying a first ranking to reference pictures stored in the reference picture buffer for the first picture; and (ii) applying a second ranking to the reference pictures stored in the reference picture buffer for the second picture. For example, for each view, the reference pictures stored in the reference picture buffer are ranked based on the temporal distance between the reference picture and the current picture, the view index differences, and/or the quantization parameters of the reference pictures.

(A13) In some embodiments of any of A10-A12, a first reference picture is selected from the reference picture buffer for decoding the first picture. The first reference picture is selected based on a determination that the first reference picture is a reference picture closest to the first picture. For example, for reference pictures with the same temporal distance between the reference picture and the current picture and same quantization parameters, the reference picture closer to the current view is prioritized to be selected as an applicable reference picture for the current picture.

(B1) In another aspect, some embodiments include a method (e.g., the method 650) of video encoding. In some embodiments, the method is performed at a computing system (e.g., the server system 112) having memory and control circuitry. In some embodiments, the method is performed at a coding module (e.g., the coding module 320). The method includes: (i) receiving multi-view video data comprising a plurality of pictures, where the plurality of pictures includes a first picture corresponding to a first view and a second picture corresponding to a second view; (ii) determining whether reference picture information is to be shared for the first picture and the second picture; and (iii) when the reference picture information is to be shared: (a) encoding the first picture and the second picture using the reference picture information; and (b) signaling, in a multi-view video bitstream, that the reference picture information is to be shared (B2) In some embodiments of B1, the method includes, when the reference picture information is not to be shared, signaling first reference picture information for the first picture and signaling second reference picture information for the second picture.

(B3) In some embodiments of B1 or B2, whether the reference picture information is to be shared is signaled via a high-level syntax in the multi-view video bitstream.

(B4) In some embodiments of any of B1-B3, the method includes: when the reference picture information is to be shared, signaling, in the multi-view video bitstream: (i) shared reference picture information for the first picture and the second picture; (ii) first reference picture information for the first picture; and (iii) second reference picture information for the second picture. For example, the first reference picture information is combined with the shared reference picture information to generate/populate a first reference picture list for the first picture, and the second reference picture information is combined with the shared picture information to generate/populate a second reference picture list for the second picture.

(B5) In some embodiments of any of B1-B4, whether the reference picture information is to be shared for the first picture and the second picture is determined based on a temporal level of the first picture.

(B6) In some embodiments of any of B1-B5, when the reference picture information is shared, (i) a first set of reference pictures is signaled for the first view; and (ii) delta information is signaled for the second view, the delta information to be used with the first set of reference pictures to derive a second set of reference pictures for the second view.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source multi-view video sequence that comprises a plurality of frames; and (ii) performing a conversion between the source multi-view video sequence and a multi-view video bitstream of visual media data according to a format rule. The multi-view video bitstream comprises (i) the plurality of encoded pictures includes a first picture corresponding to a first view and a second picture corresponding to a second view and (ii) when reference picture information is to be shared for the first picture and the second picture, shared reference picture information. The format rule specifies that when the reference picture information is to be shared, the first picture and the second picture are to be decoded using the shared reference picture information. In some embodiments, when reference picture information is not to be shared for the first picture and the second picture, the multi-view video bitstream comprises first reference picture information for the first view and second reference picture information for the second view. In some embodiments, when reference picture information is not to be shared for the first picture and the second picture, the format rule specifies that the first picture is to be decoded using the first reference picture information and the second picture is to be decoded using the second reference picture information.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A13, B1-B6, and C1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A13, B1-B6, and C1 above).

Unless otherwise specified, any of the syntax elements (e.g., indicators) described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a multi-view video bitstream comprising a plurality of pictures, wherein the plurality of pictures includes a first picture corresponding to a first view and a second picture corresponding to a second view;

determining whether reference picture information is shared for the first picture and the second picture;

when the reference picture information is shared, decoding the first picture and the second picture using the reference picture information; and when the reference picture information is not shared, decoding the first picture using first reference picture information and decoding the second picture using second reference picture information, wherein the first reference picture information is signaled separately from the second reference picture information.

2. The method of claim 1, wherein determining whether the reference picture information is shared for the first picture and the second picture comprises parsing an indicator in the multi-view video bitstream that indicates whether the reference picture information is shared.

3. The method of claim 2, wherein the indicator is signaled at a frame level or a sequence level in the multi-view video bitstream.

4. The method of claim 1, further comprising, when the reference picture information is shared:

populating a first reference list for the first picture by inserting a set of reference pictures indicated by the reference picture information and inserting one or more first reference pictures; and populating a second reference list for the second picture by inserting the set of reference pictures indicated by the reference picture information and inserting one or more second reference pictures.

5. The method of claim 1, wherein whether the reference picture information is shared for the first picture and the second picture is determined based on a temporal level of the first picture.

6. The method of claim 5, wherein, when the temporal level of the first picture is less than a predetermined threshold value, the reference picture information is determined to be shared for the first picture and the second picture.

7. The method of claim 1, wherein, when the reference picture information is shared:

a first set of reference pictures is signaled for the first view; and a second set of reference pictures is derived for the second view based on the first set of reference pictures.

8. The method of claim 7, further comprising parsing respective indicators corresponding to the first set of reference pictures, each respective indicator indicating whether a corresponding reference picture of the first set of reference pictures is to be replaced for the second view.

9. The method of claim 1, wherein the first picture and the second picture are decoded using a same reference picture buffer storing the reference picture information.

10. The method of claim 9, further comprising:

identifying a first portion of the reference picture buffer to use as a first reference picture list for the first picture; and identifying a second portion of the reference picture buffer to use a second reference picture list for the second picture.

11. The method of claim 9, further comprising:

applying a first ranking to reference pictures stored in the reference picture buffer for the first picture; and applying a second ranking to the reference pictures stored in the reference picture buffer for the second picture.

12. The method of claim 9, wherein a first reference picture is selected from the reference picture buffer for decoding the first picture, wherein the first reference picture is selected based on a determination that the first reference picture is a reference picture closest to the first picture.

13. A computing system, comprising:

control circuitry;

memory; and one or more sets of instructions stored in the memory and configured for execution by the control circuitry, the one or more sets of instructions comprising instructions for:

receiving multi-view video data comprising a plurality of pictures, wherein the plurality of pictures includes a first picture corresponding to a first view and a second picture corresponding to a second view;

determining whether reference picture information is to be shared for the first picture and the second picture;

when the reference picture information is to be shared:

encoding the first picture and the second picture using the reference picture information; and signaling, in a multi-view video bitstream, that the reference picture information is to be shared; and when the reference picture information is not to be shared, signaling first reference picture information for the first picture and signaling second reference picture information for the second picture.

14. The computing system of claim 13, wherein whether the reference picture information is to be shared is signaled via a high-level syntax in the multi-view video bitstream.

15. The computing system of claim 13, further comprising, when the reference picture information is to be shared, signaling, in the multi-view video bitstream:

shared reference picture information for the first picture and the second picture;

first reference picture information for the first picture; and second reference picture information for the second picture.

16. The computing system of claim 13, wherein whether the reference picture information is to be shared for the first picture and the second picture is determined based on a temporal level of the first picture.

17. The computing system of claim 13, wherein, when the reference picture information is shared:

a first set of reference pictures is signaled for the first view; and delta information is signaled for the second view, the delta information to be used with the first set of reference pictures to derive a second set of refence pictures for the second view.

18. A method of generating a video bitstream, the method comprising obtaining a multi-view video bitstream, including:

receiving multi-view video data comprising a plurality of pictures, wherein the plurality of pictures includes a first picture corresponding to a first view and a second picture corresponding to a second view;

determining whether reference picture information is to be shared for the first picture and the second picture;

when the reference picture information is to be shared:

encoding the first picture and the second picture using the reference picture information; and signaling, in a multi-view video bitstream, that the reference picture information is to be shared;

when the reference picture information is not to be shared, signaling first reference picture information for the first picture and signaling second reference picture information for the second picture; and transmitting the video bitstream.

\* \* \* \* \*